W. E. EASTMAN.
SPRING SUSPENSION FOR VEHICLES.
APPLICATION FILED DEC. 5, 1913.
1,121,079.
Patented Dec. 15, 1914.
2 SHEETS—SHEET 1.
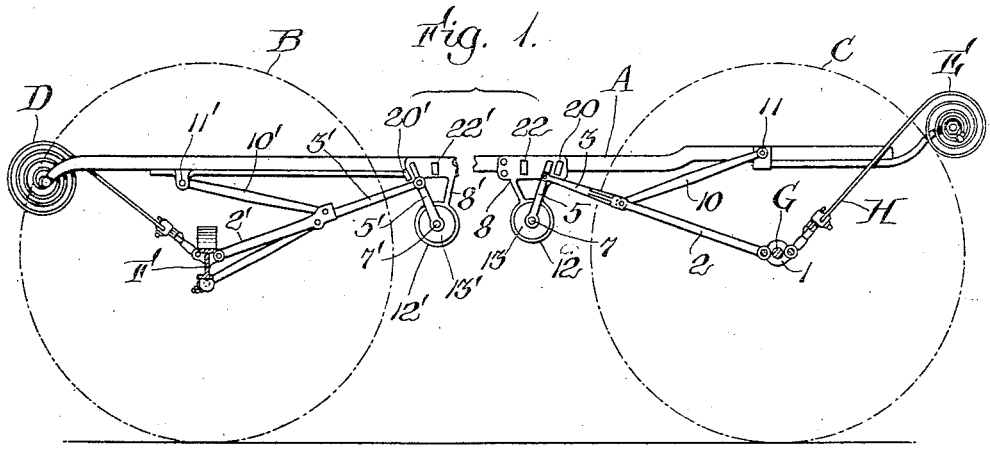
Fig. 1.
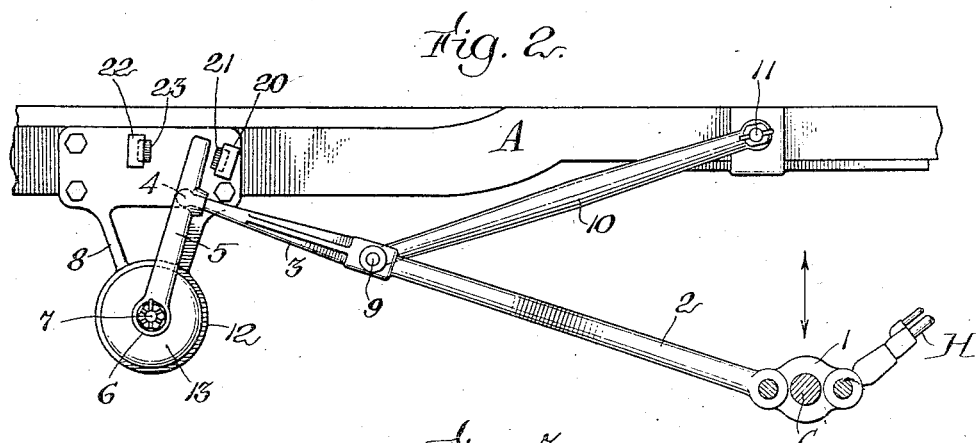
Fig. 2.
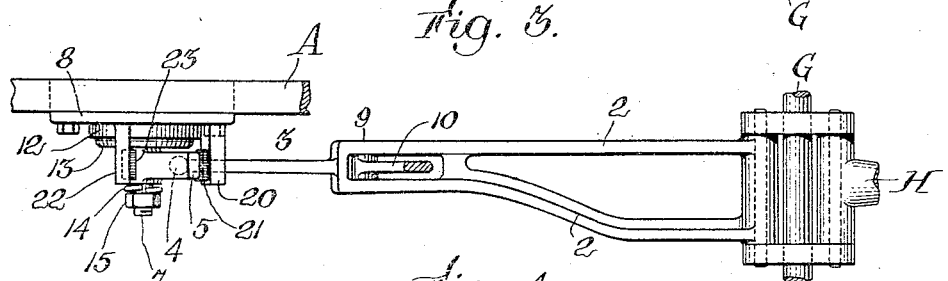
Fig. 3.
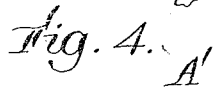
Fig. 4.
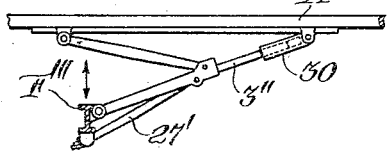
Witnesses:
H. C. Bowser.
L. B. Weymouth.
Inventor:
William E. Eastman
by his attorney
Charles F. Richardson

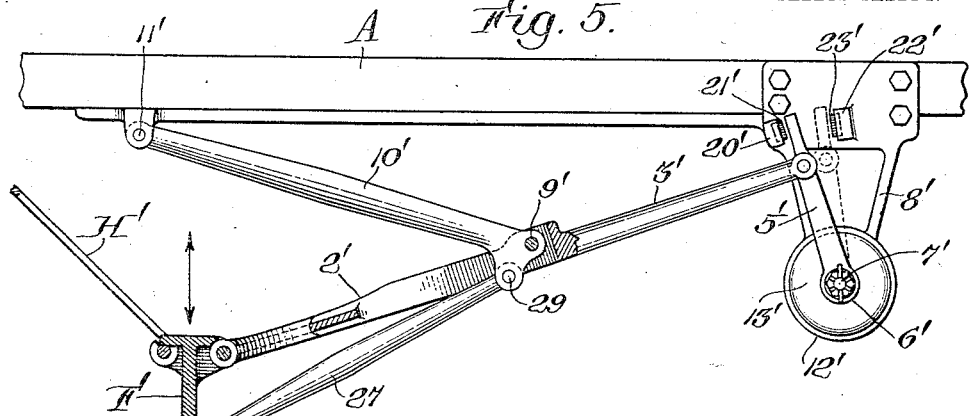
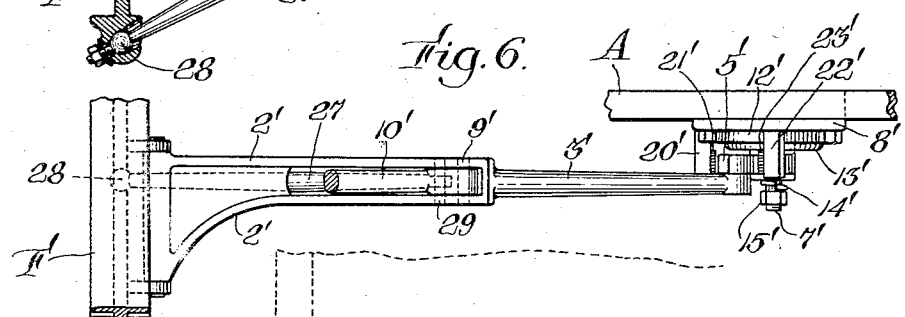
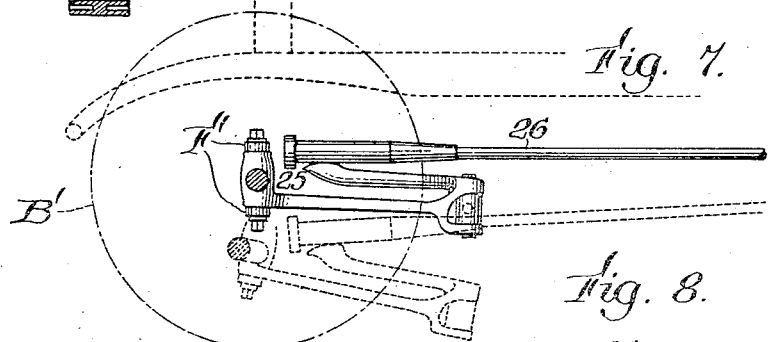
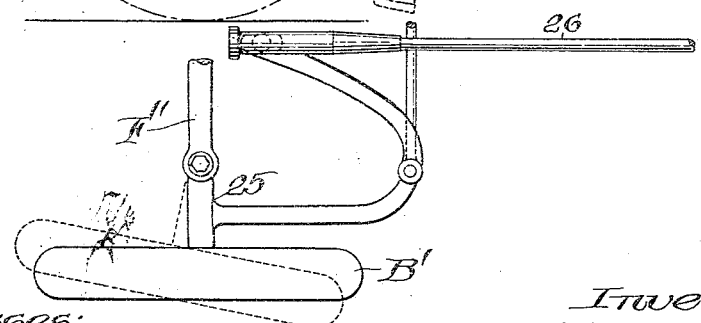

UNITED STATES PATENT OFFICE.

WILLIAM E. EASTMAN, OF WINCHESTER, MASSACHUSETTS

SPRING SUSPENSION FOR VEHICLES.

1,121,079.  Specification of Letters Patent.  Patented Dec. 15, 1914.

Application filed December 5, 1913. Serial No. 804,929.

*To all whom it may concern:*

Be it known that I, WILLIAM E. EASTMAN, a citizen of the United States, residing at Winchester, in the county of Middlesex and State of Massachusetts, have invented certain new and useful Improvements in Spring Suspensions for Vehicles, of which the following is a specification, reference being had therein to the accompanying drawings.

The features of my invention, while they may be used in other environments, are particularly useful in connection with apparatus whereby an axle supporting a vehicle body upon springs, may, in its movements toward and away from the body, be in a plane at right angles to the plane of the body; such means for example, being described and shown in United States Letters Patent No. 1,048,510, for improvements in spring suspension for vehicles, granted to me December 31, 1912.

The respective objects of these various features of my present invention are:—

First. To reduce to a minimum the resistance to the free action of the vehicle spring, offered by the friction resulting from the confined reciprocating movements of the free end of the brace rod, as in the pivoted bearing box, shown in my said Letters Patent. This object I attain by means of the first feature of my invention, viz:—a rocker arm mounted on the vehicle frame and pivotally connected to the free end portion of the brace rod; the moment resulting from the product of the frictional resistance offered to the turning of the rocker arm in its bearing, into its short arm, or radius of the bearing; being insignificant and practically *nil* as compared with the moment arising from the product of the force due to the vertical relative movements of the axle and the vehicle frame, transmitted through the brace rod, into the long arm of the rocker arm. Consequently, less resistance is offered to the movement of the axle in relation to the vehicle body, and the latter rides easier than when the brace rod is slidably mounted in a pivoted bearing box.

Second. To control not only the short and exceedingly rapid vibrations of the vehicle springs, but also the speed of the longer and obvious oscillations of the springs, due to the marked movements of the vehicle body and the wheel axle. The second feature of my invention accomplishes this object, and it resides in two friction surfaces, arranged to interfere to the desired extent with the vibratory movements of the rocker arm mentioned above; so that for example, the mechanism employed may be adapted for use in vehicles of different makes, sizes, weight, and having various tensions of springs.

Third. To provide an efficient shock absorber, and one that does not make use of the space lying between the wheel axle and the vehicle body. The feature whereby this object may be brought about, is embodied in a stop block properly positioned as upon the vehicle frame, and combined with the above mentioned rocker arm and brace rod to which the axle is secured so that when the axle has reached a predetermined position, as a desired limit of its motion, the rocker arm has, through the slowly and slightly moving brace rod, been brought into engagement with the stop block, and has stopped the movement of the axle, without perceptible shock, jar or noise.

Fourth. So to re-arrange and reverse the parts shown in my said Letters Patent, that the forward movement of the driving wheel on the rear axle will have a tendency to cause the parts to draw the vehicle body downward against the increasing compression of the supporting springs, rather than to push the body upward, and release the compression of the springs, as would the structure shown in said Letters Patent. The consequences of such re-arrangement are that the car rides with greater ease; and when passing around a curve, the action of the parts practically counteracts the centrifugal force tending to lift the inside of the vehicle upward and outward and the vehicle passes around the curve upon substantially evenly compressed springs.

Fifth. To prevent the forward axle from moving forward and back on its longitudinal axis as a center; in other words, to cause each or all of the parts of the axle to rise and fall, in relation to the vehicle body, in planes at right angles to the plane of the body; with the result that when the feature of my invention designed to attain this object, is applied to the forward axle of an automobile, the connecting levers of the steering apparatus and the connected forward wheels, are when the steering wheel is rigidly held by the driver, always in the same relative positions, regardless of the movements of the axle in relation to the car body. Heretofore, this turning movement of the axle on its axis would, even if the steering wheel were fixed, cause the wheels to move from side to side, and to such an extent of movement of the wheels, the car would "run wild", and be absolutely beyond the control of the driver. This objection, I overcome by combining with the brace rod, controller arm and wheel axle, shown in my said Letters Patent, an auxiliary controller arm pivotally connected with the axle and the controller arm, and properly proportioned by actual experiment to accomplish the result desired.

Sixth. To obtain other advantages that will become evident hereinafter.

In the drawings illustrating the principle of my invention and the best mode now known to me of embodying the same in operative structure, Figure 1 is a diagrammatic view showing the chassis, with mid-portion removed, and wheels of an automobile, provided with my invention; Fig. 2 shows an enlarged detail of my invention as applied to the rear axle of an automobile; Fig. 3 is a plan of what is shown in Fig. 2, a part of the controller arm being broken off for the sake of clearness. Fig. 4 depicts features of my invention, with end portion of brace rod which is slidably mounted in a pivoted bearing box, instead of pivoted to a rocker arm. Fig. 5 illustrates an enlarged detail of my invention, when used with the forward axle of an automobile; the axle being sectioned, and one side of the brace rod removed. Fig. 6 is a plan of what appears in Fig. 4. Figs. 7 and 8 are an elevation and plan of the forward wheel, a part of the axle and the steering rods, and connections of the old structure, illustrating by dotted lines the objectionable movements of the old structure, that may be overcome by one feature of my present invention.

In Fig. 1 is shown, diagrammatically, in elevation, the chassis A of an automobile, mounted upon wheels B, C, by spiral springs D, E, such as illustrated in said above mentioned Letters Patent; the relative movements of the chassis and wheel axles F, G, being controlled by the remaining mechanism, which embody all of the features of my present invention; and which, of course comprise not only what is shown, but what is in duplicate directly behind, but not seen, on the opposite side of the chassis. A description of the visible portions of the mechanism will suffice for the unseen duplication.

To a pair of supporting members 1, 1, on the rear axle G, Figs. 2 and 3, are pivotally connected the outer portion or extension H of the rear spring E, and a brace rod 2; the forward end portion 3 of this brace rod being operatively connected by means of a ball and socket joint 4 to a rocker arm 5 mounted integral with a bushing 6 having a suitable bearing, on a spindle 7 projecting horizontally from a bracket 8 depending from the chassis.

Pivotally connected to the brace rod 2, at point 9, in the position shown in Fig. 2, is a controller arm 10 whose opposite end is pivoted to the chassis at 11. This structure is designed to cause the rear axle in any of its movements in relation to the chassis, to move in a plane at right angles to the plane of the chassis; the lengths of the various lever arms and the positions of the pivots, all being experimentally determined and laid out to move in substantially the same manner as pointed out and claimed in said above mentioned patent.

In the structure shown in said Letters Patent, an objectionable amount of friction developed between the pivoted journal box and the free end portion of the brace rod, slidably mounted therein, and, through the brace rod, was sufficient seriously to interfere with the natural action of the springs, and hence the smooth riding of the car. Frequent and copious oiling served no purpose; and mud and dirt, working between the bearing surfaces greatly increased the frictional resistance to the free movement of the brace rod. The rocker arm 5 and ball and socket connection between it and the brace rod overcome this objection. While the center of the pivot between the rocker arm and the brace rod does actually change its position in relation to the chassis, yet for all practical purposes, it remains substantially the same, and does not produce any appreciable variation in the desired line of movement of the axis of the axle of the rear wheel. The friction between the bushing 6 and spindle 7, brought about by the thrust of the brace rod down through the rocker arm, obviously is easily overcome by the force exerted by the brace rod, acting through an arm having a length extending from the center of the spindle 7 to the center of the connection 4 between the rocker arm 5 and the brace rod 2. The first object of my invention is thus attained.

It was found also that under some conditions, the chassis was too delicately supported, and greater or less resistance had to be introduced at a suitable point in the mechanism, to retard the supporting members in their speed of movements, and hence bring about the even riding of the car body. To accomplish this object, there is secured to the depending bracket 8, a stationary, frictional disk 12, while a second frictional disk 13, is integrally connected with the bushing 6 mounted on the spindle 7; the pressure required for the desired friction, to regulate the speed of movement of the rocker arm 5 and hence of the wheel axle G, being determined by means of a spring washer 14, Fig. 3, and a nut 15 upon the outer end portion of the spindle 7, and engaging the washer.

The second feature of my invention and its purpose are now plain.

The third feature resides in means whereby any abnormal movement of the chassis away from the axle, forward or rear, resulting from undue compression of the springs E, may be prevented by overcoming the momentum of the chassis A, say, before the spring ceases to be compressed. This feature is embodied in a stop 20 fixed to the bracket 8 and provided with a rubber buffer 21, positioned to be engaged by the free end portion of the rocker arm 5 after it reaches and exceeds a predetermined position; that is, whenever the chassis A and the axle, as G connected by the brace rod 2 and controller arm 10, to the rocker arm 5, would, unless opposed, recede from each other more than is desirable. A similar stop 22 and rubber buffer 23 may be used to limit the movement of the rocker arm 5 in an opposite direction and, therefore, avoid an undue approach of the chassis to the axle; the increasing resistance when offered by the stop and buffer, acting in unison with the increasing tension upon the spring, and finally overcoming the momentum of the chassis in its approach toward the axle, before a fixed tension of the spring is reached.

The parts of my invention above described are found also in relation to the forward axle F shown in Figs. 1 and 5, and for the purpose of identifying them there, without further description, will be given the same numbers, but primed.

The next and fourth feature of my invention resides in the locations of the brace rods and controller arms, with respect to the front and rear axles F, G, and chassis A; said rods and arms being in a position, the reverse of that shown in the above mentioned Letters Patent. As already stated, when arranged as in said patent, the tendency of the forward moving driving rear wheel, is to lift the chassis upward and away from the axis of the rear wheel, the power from the rear wheel being transmitted by a pull along the brace rod and a push or thrust upward along the controller arm to the body; and as the forward axle receives its movement from the forward movement of the body, necessarily it is pulled forward by means of a thrust along the controller arm and a tension along the brace rod, the result being that the forward portion of the body or chassis has a like tendency to rise upward and away from the forward axle. This consequent upward movement of the whole body becomes especially noticeable at high speeds and on curves. To overcome this tendency, the parts are reversed as shown in Fig. 1, so that the controller arms 10, 10', are subjected to tension, while the brace rods 2, 2' receive thrusts; and the power required of the driving rear axle, to move ahead the chassis and the front axle, is directed in such a manner as to tend to pull the chassis downward toward both axles, rather than upward and away from them, when the car has a forward movement.

The fifth feature of my invention resides in means whereby not only the center of the longitudinal axis of the axle, but also all parts of the axle, are within working limits, caused to rise and fall substantially in planes at right angles to that of the plane of the chassis, and thus do away with certain resulting movements of the forward wheels, that are due to partial rotations or oscillations of the axle about its longitudinal axis and that cannot be controlled by the steering apparatus.

An inspection of Figs. 7 and 8 will make plain how a forward axle F', Fig. 8, not provided with means for preventing these partial rotations or oscillations of the axle, will cause the wheels, as B' of an automobile, mounted on a knuckle arm 25, pivoted in the usual manner, to move in and out, notwithstanding the steering rod 26, and wheel not shown, are held absolutely rigid. If the steering wheel is rigid, and the steering rod has no longitudinal movement, and the longitudinal axis of the forward wheel has a movement in said plane at right angles to the chassis, while the other parts of the axle move in planes other than at right angles to the plane of the chassis, yet the pivoted wheels will be compelled by the pivoted connecting rigid parts, to move in or out as the case may be, or something will break. Obviously, as the forward wheel is pivoted to the outer end of the axle and is also pivotally connected with the free end of the steering rod, which, for the time being, is assumed to be longitudinally stationary, the forward wheel will, because of this movement, assume a position different from that which it would, were all of the parts held, as by an auxiliary controller arm 27, Figs. 1, 5 and 6, stationary, in relation to the steering rod, and moving in planes at right angles to the plane of the chassis. This auxiliary controller arm 27, which is novel, has one end portion connected by means of a ball and socket joint 28, Fig. 5, with the lower portion of the axle F, while the other end portion is pivoted to the controller arm 10', at 29, adjacent to the pivot 9' of the controller arm to the brace rod 2'; the lengths of the brace rod, controller arm, auxiliary controller arm, and the distances between the various pivots of the connecting parts, all being so designed as to bring about the desired movements of all the parts of the axle in planes at right angles to the plane of the chassis. In short, by means of the above described mechanism or equivalent constructions, this forward and back movement about the longitudinal axis of the forward axle is obviated, and the connections between the steering wheel and the wheel on the forward axle are always in such a position that the forward wheel can not move without a corresponding movement of the steering wheel.

In Fig. 4 is shown a modified form of my invention used where the brace rod 3" slides in a pivoted bearing 30, instead of being connected with a rocker arm 5, as appears in Figs. 1, 2 and 5, but the resulting non-oscillatory movements of the axles F" and F are substantially the same in both constructions, however.

Having described all of the various features of my invention and desiring to protect them in the broadest manner legally possible, what I claim is:—

1. In a vehicle, an axle; a controller arm; a brace rod; an auxiliary controller arm, pivoted to the controller arm; the axle being pivoted both to the brace rod and the auxiliary controller arm; and pivotal means to permit longitudinal movements of the brace rod; all combined to hold each part of the axle in its respective plane substantially at right angles to the plane of the body of the vehicle.

2. In apparatus designed to cause the axis of an axle to move in a plane at right angles to the plane of the body of a vehicle: a brace rod connected with the axle; a rocker arm pivoted to the body of the vehicle, its free end being pivoted to the brace rod; a controller arm pivoted to the vehicle body and to the brace rod; all designed to reduce to a minimum the friction due to the movement of the brace rod.

3. In a vehicle, an axle; a controller arm; a brace rod; an auxiliary controller arm, pivoted to the controller arm; the axle being pivoted both to the brace rod and the auxiliary controller arm; and an arm pivoted to the body of the vehicle, its free end being pivoted to the brace rod, designed to reduce to a minimum the friction due to the movements of the brace rod; all combined to hold each part of the axle in its respective substantially vertical plane of movement.

4. In a power driven vehicle mounted upon springs secured to an axle and having apparatus designed to cause the axis of an axle to move in a plane at right angles to the plane of the body of the vehicle; a brace rod connected to the axle; pivotal means secured to the vehicle body to permit substantially longitudinal movements of the brace rod; a controller arm pivoted to the vehicle body and to the brace rod; all being so arranged in relation to the vehicle body that, when the body of the vehicle is moving forward, the controller arm is subjected to tension.

5. In a power driven vehicle mounted upon springs secured to an axle, and having apparatus designed to cause the axis of a driving axle to move in a plane at right angles to the plane of the body of the vehicle; a brace rod, connected to the driving axle; pivotal means secured to the vehicle body forward of the driving axle, to permit substantially longitudinal movements of the brace rod; a controller arm pivoted to the vehicle body and extending forwardly where it is pivoted to the brace rod, so that as the driving axle moves forward, the controller arm is subjected to tension, and tends to compress the adjacent spring of the vehicle.

6. In a power driven vehicle mounted upon springs secured to an axle and having apparatus designed to cause the axis of a driving axle and the axis of a driven axle to move in planes at right angles to the plane of the body of the vehicle; a brace rod, connected to the driven axle; pivotal means secured to the vehicle body, rearward of the driven axle, to permit substantially longitudinal movements of the brace rod; a controller arm pivoted to the vehicle body and also extending rearwardly and being pivoted to the brace rod so that as the vehicle body moves forward and drives ahead of the driven axle, the controller arm is subjected to tension and tends to compress the adjacent spring of the vehicle; a similar combination of elements comprising a brace rod connected to the driving axle; pivotal means secured to the vehicle body, forward of the driving axle, to permit substantially longitudinal movements of the brace rod, a controller arm pivoted to the vehicle body and extending forwardly where it is pivoted to the latter brace rod, so that as the vehicle body moves forward the latter controller arm is subjected to tension; and tends to compress the adjacent spring of the vehicle.

7. In apparatus designed to cause the axis of an axle to move in a plane at right angles to the plane of the body of a vehicle; a controller arm; a brace rod, connected with the axle; a rocker arm pivoted to the body of a vehicle, its free end being pivoted to the brace rod, all designed to reduce to a minimum the friction due to the movements of the brace rod; friction disks, one fixed to the vehicle body, the other to the rocker arm, and means to create more or less friction between said disks, to hinder to a greater or less extent, movements of the rocker arm, and hence, through connecting parts, the speed of the movements of the axle.

8. In apparatus designed to cause the axis of an axle to move in a plane at right angles to the plane of the body of a vehicle; a controller arm; a brace rod connected to the axle; pivotal means to permit longitudinal movements of the brace rod; and a stop fixed to the vehicle body but in such a position that it limits the motion of the brace rod, when the axle has reached a predetermined position in relation to the body of the vehicle.

9. In apparatus designed to cause the axis of an axle to move in a plane at right angles to the plane of the body of a vehicle; a controller arm; a brace rod, connected with the axle; a rocker arm pivoted to the body of a vehicle, its free end being pivoted to the brace rod, all designed to reduce to a minimum the friction due to the movements of the brace rod; a stop fixed to the vehicle body, but in such a position that it is engaged by the rocker arm, and brace rod, when the axle has, in relation to the body of the vehicle, reached a predetermined position.

In testimony whereof I hereunto affix my signature in the presence of two witnesses.

WILLIAM E. EASTMAN.

Witnesses:
  E. F. UNIAC,
  CHARLES F. RICHARDSON.